J. I. BOYCE.
LOCK NUT.
APPLICATION FILED APR. 22, 1908.
917,530.
Patented Apr. 6, 1909.
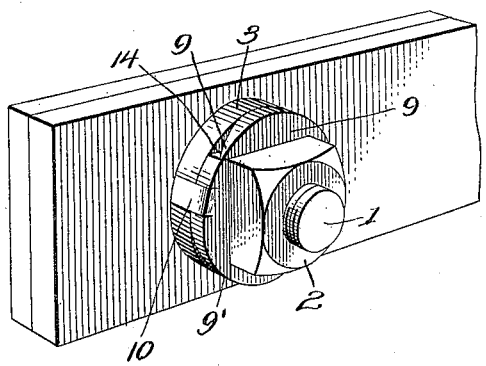
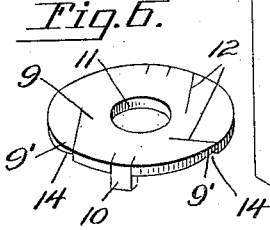 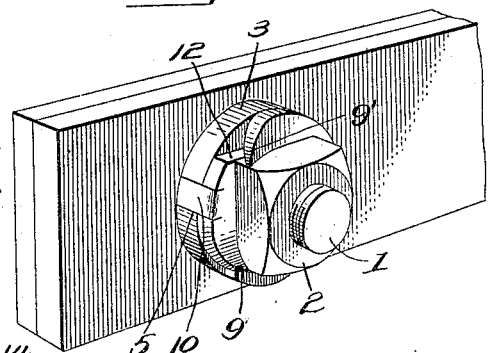 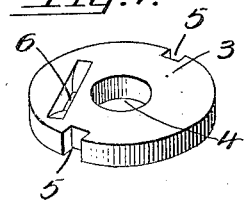
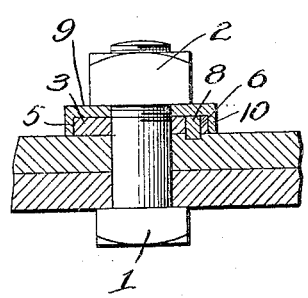 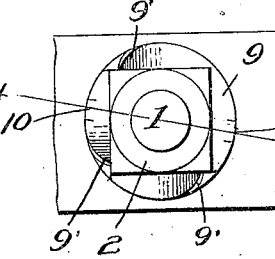 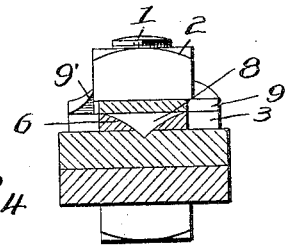
Inventor
James I. Boyce.
Witnesses
F. C. Gibson
Wm. Roerth
By Victor J. Evans
Attorney

UNITED STATES PATENT OFFICE.

JAMES I. BOYCE, OF LEECHBURG, PENNSYLVANIA.

LOCK-NUT.

No. 917,530.　　　　Specification of Letters Patent.　　　　Patented April 6, 1909.

Application filed April 22, 1908. Serial No. 428,558.

*To all whom it may concern:*

Be it known that I, JAMES I. BOYCE, a citizen of the United States, residing at Leechburg, in the county of Armstrong and State of Pennsylvania, have invented new and useful Improvements in Lock-Nuts, of which the following is a specification.

This invention relates to lock nuts, and the object of the invention is to provide an extremely simple and efficient device whereby a nut of the ordinary construction may be effectively retained in locked position upon a bolt also of the ordinary construction.

Another object of the invention is to provide a device, the parts of which are so constructed and arranged as to readily retain a bolt in locked position upon a nut whether the bolt or nut be applied to a metal or wooden surface.

With these objects in view the invention resides in the novel construction of elements, hereinafter fully described and claimed.

In the accompanying drawings, Figure 1 is a perspective view of a nut lock constructed in accordance with the present invention, showing the nut in position upon the bolt and in a position to be engaged by the segments provided by the washer 9. Fig. 2 is a similar view illustrating the nut in locked position. Fig. 3 is a front elevation of Fig. 2. Fig. 4 is a sectional view upon the line 4—4 of Fig. 3, the bolt 1 and nut 2 being illustrated in side elevation. Fig. 5 is a cross sectional view illustrating the detent in engaging position. Fig. 6 is a perspective view of the washer 9. Fig. 7 is a detail perspective view of the washer 3. Fig. 8 is a detail perspective view of the detent.

In the accompanying drawings the numeral 1 designates a threaded bolt of ordinary construction, and the numeral 2 designates the nut adapted to coöperate with the bolt.

In securing the nut upon the bolt when connecting iron plates as illustrated in Fig. 1 of the drawings, I provide a washer 3, having a central orifice 4 adapted for the reception of the bolt 1, and having its periphery provided with diametrically opposite offsets or recesses 5, the purpose of which will hereinafter be described. The washer 3 is also provided with a V-shaped slot or opening 6, adapted for the reception of a V-shaped detent 8, by which the washer 3 is secured upon the iron plate. The washer 3 is constructed preferably of soft iron, and the detent 8 is constructed of tool steel. In applying the washer to the plate, the washer is first fitted over the bolt 1 and positioned adjacent the plate to which it is to be secured. The detent 8 is positioned within the slot 6 and given a violent blow with a hammer so as to insure its insertion within the plate. When the washer 3 is thus positioned upon the plate, I provide a second washer 9, having diametrically positioned lugs 10 adapted for engagement with the cut away portions 5 of the washer 3, and a central orifice 11, by which it is positioned upon the bolt 1 adjacent the washer 3. The washer 9 is constructed of soft steel or other desired metal, and is provided upon its periphery with slits 12. The nut 2 is screwed upon the bolt 1 until it tightly engages the washer 9, forcing the said washer into tight engagement with the washer 3 and likewise pressing the washer 3 against the plate which it engages. When the nut 2 is screwed home the peripheral segments of the washer 9 provided by the slits 12 are bent upward to form retaining tongues, as clearly illustrated in the figures of the drawings, and the said tongues are adapted to lie against the sides of the nut 2 and thus effectively prevent the nut from turning upon the bolt 1.

From the above description it will be seen that I have provided a simple, cheap and effective device for securely locking nuts and bolts against rotation, one which may be readily applied to metal or wooden plates, and which is readily applicable to nuts and bolts of the ordinary construction.

In order to provide means whereby an instrument may be inserted between the members 3 and 9 when it is desired to bend the tongues 9' outwardly upon the nut 2 the inner edges of the said tongues 9' are under cut or inclined as at 14, thus providing a substantial opening between the members 3 and 9 whereby the said tongues may be easily and quickly bent upon the nut.

Having thus fully described the invention what is claimed as new is:

The combination with a threaded bolt and nut therefor, of a plate having recesses and a V-shaped opening, a V-shaped detent for the opening having its apex projecting beyond the inner face of the plate, a washer having lugs adapted to engage the recesses of the plate, the washer being provided upon its body with slits extending inwardly from its periphery, the segments provided by the slits having their peripheral faces inclined, and said segments adapted to be bent against the sides of the nut to prevent the rotation of the nut upon the bolt.

In testimony whereof I affix my signature in presence of two witnesses.

JAMES I. BOYCE.

Witnesses:
FRANK TAYLOR,
CHARLES E. ROSENSTEEL.